(No Model.)  3 Sheets—Sheet 1.
A. L. PARCELLE.
ELECTRICAL SYNCHRONOUS MOVEMENT.
No. 345,721.  Patented July 20, 1886.
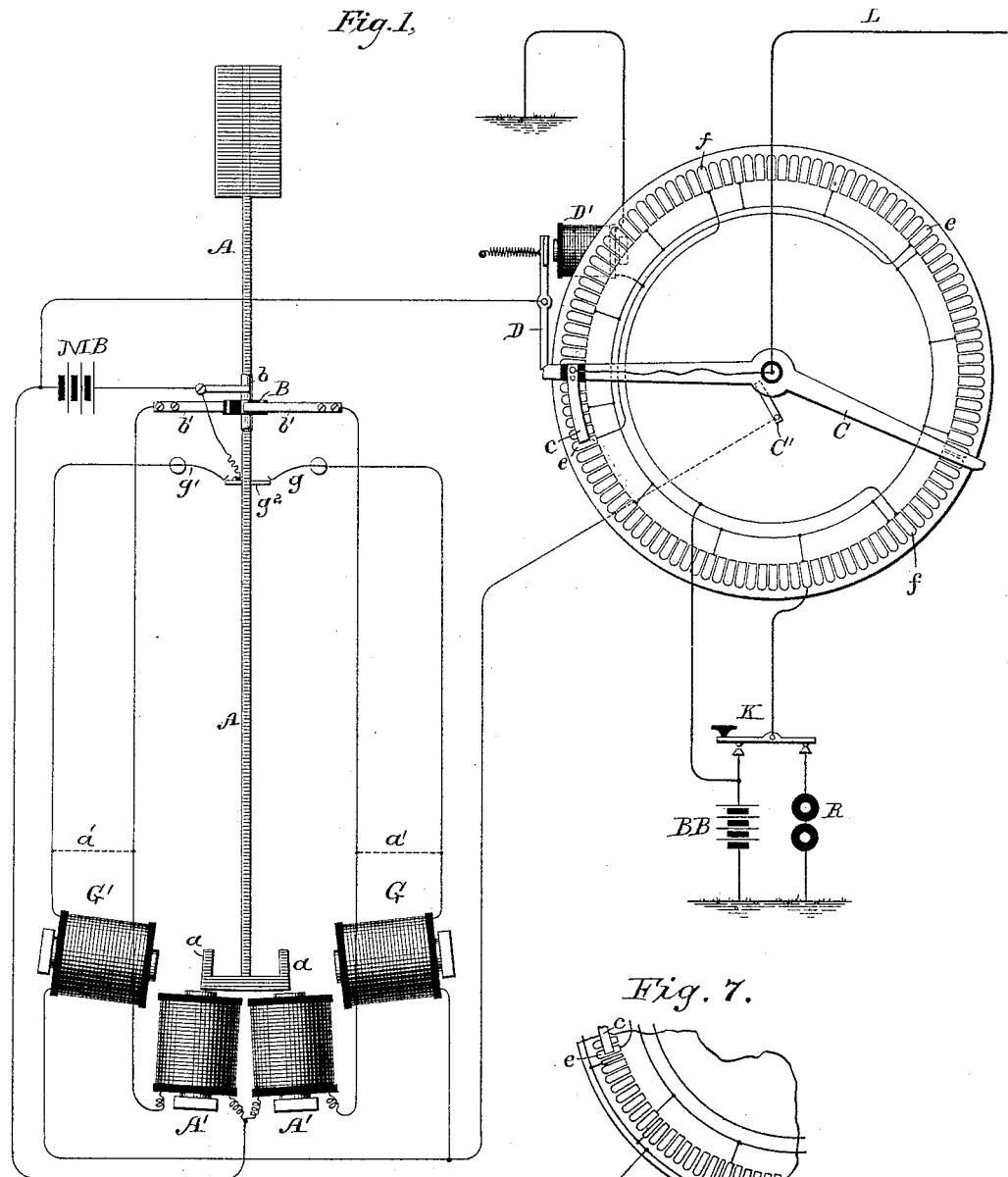
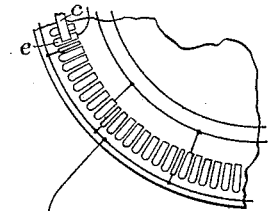
Witnesses
Geo. W. Breck.
Carrie E. Ashley
Inventor
Albert L. Parcelle,
By his Attorneys
Baldwin, Hopkins & Payton

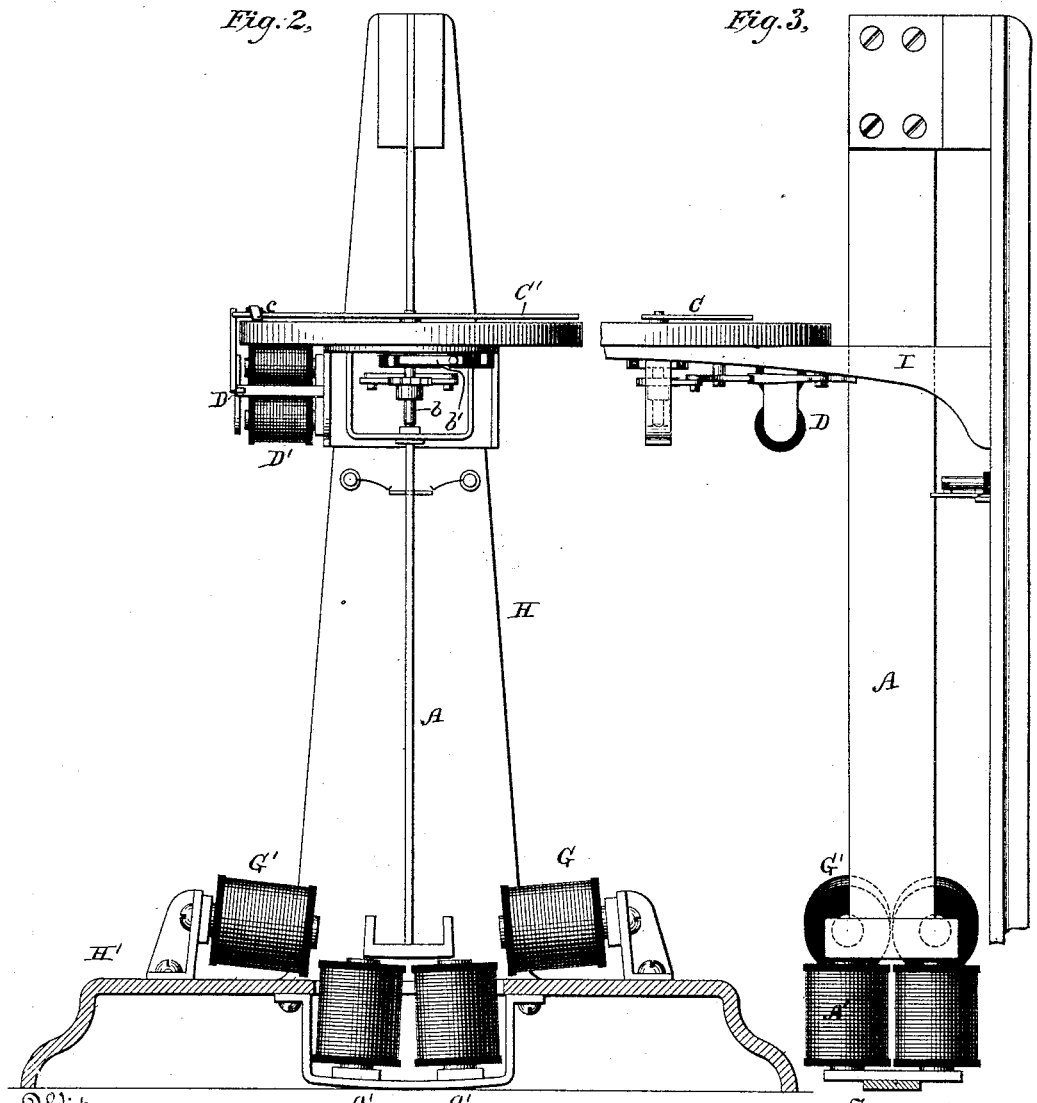

(No Model.) 3 Sheets—Sheet 3.
A. L. PARCELLE.
ELECTRICAL SYNCHRONOUS MOVEMENT.
No. 345,721. Patented July 20, 1886.
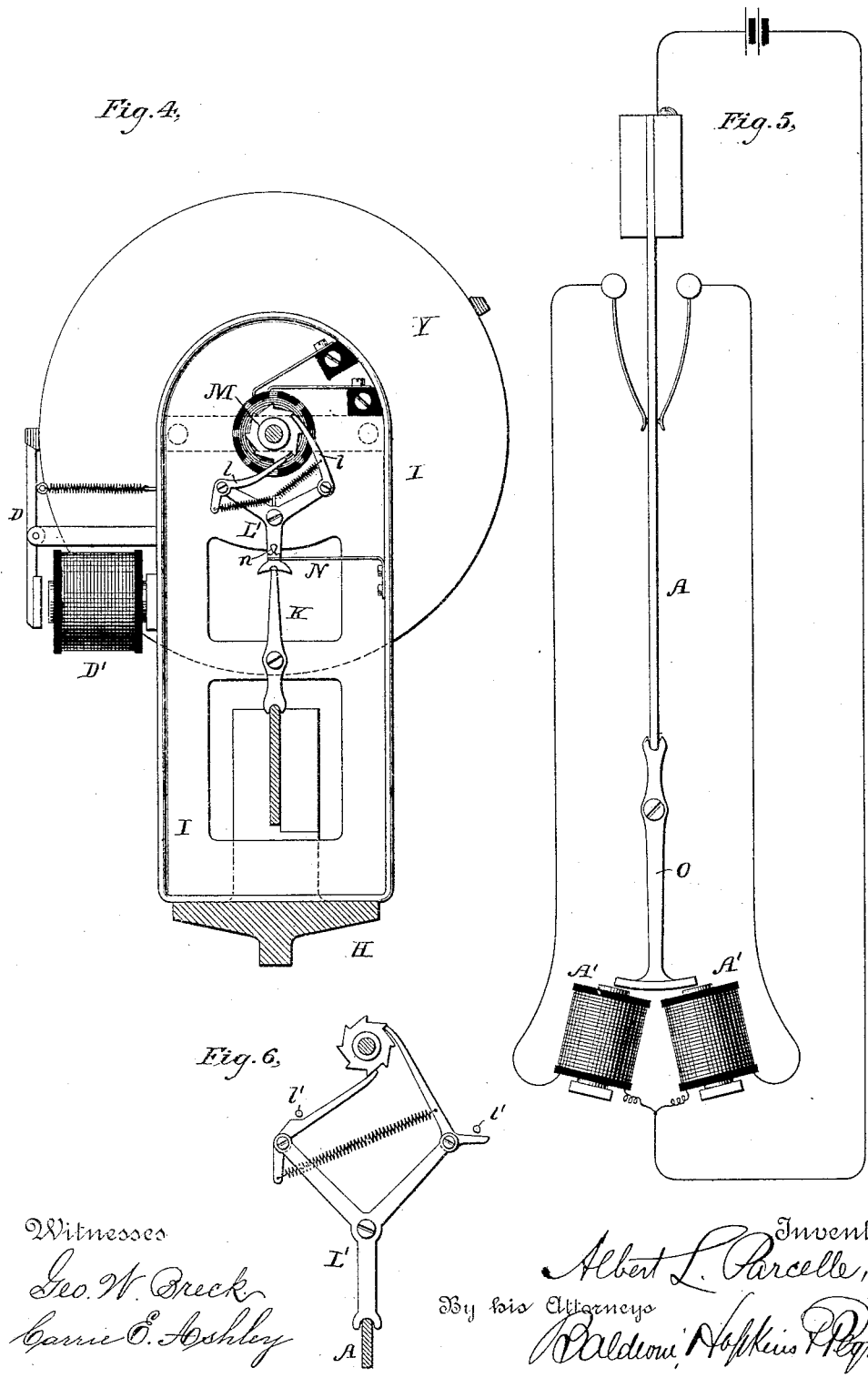

UNITED STATES PATENT OFFICE.

ALBERT L. PARCELLE, OF BOSTON, MASSACHUSETTS, ASSIGNOR TO THE NATIONAL ELECTRICAL COMPANY, OF NEW YORK, N. Y.

ELECTRICAL SYNCHRONOUS MOVEMENT.

SPECIFICATION forming part of Letters Patent No. 345,721, dated July 20, 1886.

Application filed December 11, 1885. Serial No. 185,383. (No model.)

*To all whom it may concern:*

Be it known that I, ALBERT L. PARCELLE, of Boston, Suffolk county, Massachusetts, have invented certain new and useful Improvements in Electrical Synchronous Movements, of which the following is a specification.

My invention relates to synchronous movements of the class shown in Letters Patent No. 324,153, granted to me August 11, 1885, and covers certain improvements on the mechanism and arrangement shown in said patent.

In the accompanying drawings, Figure 1 is a diagrammatic plan view illustrating the organization at one station. Fig. 2 is a front elevation of the synchronously-actuated apparatus and the motor for actuating it; Fig. 3, a side elevation; Fig. 4, a view, partly in section, looking at the under side of the devices which actuate the synchronously-moving apparatus; Fig. 5, a detail view showing a modified form of vibrator, and Fig. 6 a view showing an arrangement of rocking pawls by means of which the vibrator actuates the synchronous device.

In my prior patent, above mentioned, I have shown an arrangement in which the vibrator at either station would be held up or checked whenever the apparatus at that station runs too fast. This was, however, accomplished by means of the energizing of the motor-magnets. In the present case I accomplish the retardation of the vibrator by means of supplementary magnets, preferably placed in independent or shunt circuits, which are completed when the vibrator at the station moves too rapidly.

Referring now to Fig. 1, A is the vibrator, which may be of any suitable size and shape, but is preferably, for an instrument of this kind, about eight inches long.

A' A' are the motor-magnets, and B a commutator mounted upon a rotating shaft, $b$, a small section only of which is shown in Fig. 1, which may be driven by the vibrator, either in the manner illustrated in Fig. 4 or in the way shown in my application now pending, filed August 10, 1885, No. 174,008, or in any other suitable manner.

The motor-battery M B has one pole connected with the shaft $b$ or hub of the commutator, the brushes of which, $b'$ $b'$, are connected with the coils of the motor-magnets A' A', while the opposite pole of the motor-battery is connected with the opposite ends of the coils of the motor-magnets. By this arrangement the circuit of the motor-magnets will be made and broken and the vibrator continuously actuated, as will be well understood, and as is fully described in my pending application before mentioned.

The trailing circuit-completer C, which travels over the table of contacts, may be driven directly by the shaft $b$, or, as shown in the other figures of the drawings, it may be driven in any other suitable way from the vibrator A. This rotary arm carries an insulated trailing finger, $c$, on one end, and its ends are preferably beveled to make contact with the beveled end of the pivoted detent or circuit-completing lever D, one end of which carries an armature for an electro-magnet, D'. The coil of this magnet is grounded on one side, and on the other side is connected to the ground-contacts $e$ $e$ in the circle of contacts.

$f f$ are the battery-contacts, which are connected with the battery B B. The arrangement of the ground and battery contacts and of the magnet D' is the same as in my previous patent, and no further description will be necessary. The insulated main-line wire L runs first to the center bearing of the rotating finger, and is carried along the finger and connected with the insulated trailing finger $c$. The arrangement of ground and battery contacts and circuit-connections is the same at the distant station. As described in my prior patent, if the finger illustrated at the station shown in Fig. 1 has traveled too rapidly, it will abut against the detent D and be checked. In this position the trailing finger $c$ will rest upon the ground-contact $e$, with which the magnet D' is connected. When, therefore, the finger at the distant station, which travels substantially at right angles with the finger at the station illustrated, has reached a position in which its trailing finger $c$ comes upon the battery-contact F, an impulse will be sent over the line and through the coil of the magnet D', thus drawing down the detent, releasing the trailing arm C, and permitting the arms at both stations to start together. This operation is fully described in my prior patent, and needs no further description here.

The correction of the vibrator at the moment when the rotating finger c is checked by the detent may be accomplished in the following manner: One pole of the battery MB is connected with the detent or correcting-circuit completer D, from which the circuit extends from the arm C to a bearing-finger, C', which makes contact with its hub. This finger is connected through the coil of the correcting-magnet G to an insulated contact finger, g, secured in a post mounted on the frame, and also through the opposite correction-magnet, G', and from thence to a corresponding insulated contact-finger, g'. A pin or contact, $g^2$, on the vibrator is arranged in such relation to the contact-fingers g g' as to make contact with them alternately as the vibrator vibrates. This finger is connected, as shown, with the opposite pole of the battery MB. When, therefore, the rotating arm C has moved too rapidly and is checked by the detent D, the correcting-circuit just traced will be closed on one side or the other of the vibrator through either one of the fingers g g' with which it happens to be in contact, by the mere contact between the arm C and detent D, and a movement of the detent, as in my prior patent, is not necessary to effect a completion of the circuit. The commutator is preferably so timed with reference to the movement of the vibrator and the vibrator-magnets A' as to open the circuit of the vibrator-magnets when the center of the armature on the vibrator comes opposite the pole of the vibrator-magnet. The vibrator will then be corrected solely by the action of the side correcting-magnets, G G'. In order to render their action on the vibrator more efficient, the armature on the vibrator is provided with side flanges or armature-pieces, a, on which the correcting-magnets G G' act.

If desired, the correcting or shunt circuit just described may be completed not only through the correcting-magnets G G', but also through the vibrator-magnets A A', by connecting the two circuits at the points indicated by the dotted lines marked a'. With this method of correction it will be observed that the effect of the side correcting-magnets is to extend or prolong the vibration. Either action would be a retardation, for it is well understood that if one of the vibrations of a body having a normal or fundamental rate of vibration is lengthened the rate is momentarily retarded. Corrections effected in this way act with great delicacy upon the vibrator, and without any perceptible check or change, otherwise than to effect the slight necessary diminution of rate to bring the apparatus at the two stations into synchronism.

I have shown the pin $g^2$ and the contact-fingers g g' as a simple and efficient manner of alternately completing the correcting-circuit on the opposite sides of the vibrator; but any other suitable apparatus or arrangement of circuits might be employed. In the construction shown the correction may take place twice in each revolution, because, when the end of the arm C which does not carry the trailing finger abuts against the detent the trailing finger is then upon the ground-contact e on the opposite side of the circle of contacts.

I have thought it necessary only to show means for effecting but two corrections in each revolution. The contacts in the circular series of contacts, other than the ground and battery contacts above mentioned, may be connected in circuit for ordinary Morse transmission. Thus I have shown a key, K, and a relay, R, connected with twelve of such contacts taken at equal intervals around the circle of contacts. Should the arm C, therefore, be rotated twice a second, the operator at the key K would have twenty-four completions of the circuit every second, and he could telegraph with as much facility as if the main line were devoted exclusively to his use. This operation is fully set forth in my prior patent, and further description here is unnecessary. I have merely indicated the battery B B, a key, and a relay to represent the telegraph-instruments.

The instruments may be mounted in the manner shown in Figs. 2 and 3—that is, the vibrator may hang vertically with its fixed clamped end at the top suitably supported in an upright frame, H, carried by a bed-plate, H'. The motor-magnets A' may be set in the depression or opening in the bottom of the bed-plate, as shown in Fig. 2, and the correcting-magnets G G' may be mounted upon suitable brackets on the base-plate. The shaft b, which carries the commutator, and to which the rotating arm C' may be connected, is mounted in bearings b' in a horizontally-projecting bracket or frame I, which is carried by the upright H. This frame is fully shown in Fig. 4. The vibrator A passes through it, as shown, and vibrates a pivoted arm or lever, K, interposed between the anchor-lever L' and the vibrator. The inner end of the lever K is formed with a notch, which straddles the outer edge of the vibrator, while its upper end engages with a pivoted anchor-lever, L', substantially in the manner shown in my prior patent. This anchor-lever has two radiating arms, which project radially equal distances from its pivot and carry spring-controlled pawls l, that engage in the teeth of a ratchet-wheel, M, on the spindle b. These pawls are arranged in tangential lines relatively to the ratchet-wheel, and they both operate to push the wheel and not to pull and push, as in the ordinary way. As the pivots of both pawls are equal distances from the center of motion, and they act on the wheel in the same way in substantially similar tangential lines, a very uniform and smooth rotation of the ratchet-wheel is obtained. There may be eight teeth in the ratchet-wheel, and the arm C is so related to the detent that it will reach the detent the instant that the reed is at the limit or end of a vibration. Any further movement of the vibrator will carry the interposed lever, K, out of the notch in the anchor-lever, and no further movement of the arm K until it returns and passes into the notch in the end of the anchor-lever will affect the driving-pawls $l$. A circular table of contacts, Y, is located upon the upper face of the frame I, concentrically with the shaft $b$, and the detent-magnet D' and detent-lever D are secured upon suitable brackets projecting from the frame I, all as clearly shown in Figs. 2, 3, and 4. The frame I may be adjustable up and down on the upright H, so as to bring the lever K closer to or farther from the fixed end of the vibrator, to regulate the extent of its motion. Of course, instead of operating the shaft $b$ and the rotating arm C' by means of an interposed lever, K, as shown in Fig. 4, the anchor-lever L' may make contact directly with the vibrator, as in my patent before mentioned. For some reasons, however, I prefer to interpose a pivoted lever, such as K, between the vibrator and the mechanism to be driven. For instance, when the vibrator acts directly on the anchor-lever, a very fine adjustment is required for the vibrator to pass into and out of engagement with the lever at the proper time. By using the interposed lever a fine adjustment is unnecessary. A steadying spring-lever, N, having a notched face, works against a sharp-edged stud, $n$, on the anchor-lever, so as to hold the anchor-lever L' at each end of its stroke. The pawls $l\ l$ act on the ratchet-wheel only to the extent of the movement of the lever L, and this lever is held at each side of its stroke by the steadying-spring N, irrespective of the movement of the vibrator or the intermediate arm, K. Another way of accomplishing the same uniformity of actuation of the ratchet-wheel is shown in Fig. 6. In that arrangement the lever L' may straddle the vibrator A, as shown, or an intermediate lever, K, may be employed; but in any event, whatever the motion of L', the pawls are prevented from acting on the ratchet-wheel, except at the proper time and to the proper extent, because the movement of the lever L' beyond proper distance to properly actuate the pawls will bring the pawls $l$ against adjustable pins $l'$, as clearly shown in Fig. 6, so that they will be thrown out of the ratchet-teeth and will not act until the vibrator or operating-lever has returned and again strikes the lever L', or until the vibrator or operating-lever moves the lever L' in the opposite direction, thus throwing the pawl out of engagement with the pin. The contact-fingers $g\ g'$ are mounted upon posts secured on the upright H at a suitable point. The pin $g^2$ is fixed in the inner edge of the vibrator, as will appear from Figs. 2 and 3.

To economize battery and still be able to use a reed having a high rate of vibration, the arrangement shown in Fig. 5 may be employed. There the vibrator A, instead of being acted directly upon by the vibrator-magnets, engages in the end of a pivoted lever, O, carrying the armature on which the vibrator-magnets A act. By connecting the short arm of this lever with the end of the vibrator a much wider movement of the armature is obtained, while a high rate of vibration of the reed or vibrator A can be had. The advantage of such an arrangement is, that if the armature were on a reed vibrating at a high speed it could not be brought into proper relation to the poles of the magnets, so as to hold the vibrator, as the amplitude would be so small, whereas by this plan a high-rate vibrator could be used and still be under the control of the magnets. In this arrangement the vibrator forms a common conductor for both branches of the circuit of the vibrator-magnets. The vibrator may be started into operation even without imparting mechanically an initial impulse to it, because when the magnets are both suddenly magnetized a sharp pull will be given, and as one magnet may be slightly stronger than the other the reed will be started into operation.

In order to ground the line at one or both ends, to discharge it from static and inductive effects, I have provided an arrangement such as shown in Fig. 7. In the arrangement shown in Fig. 4 there are eight teeth in the ratchet, and the rate of the vibrator could be double that, so as to give two revolutions per second. There would therefore be sixteen minute pauses theoretically—namely, one at the end of each swing of the vibrator. The trailing finger $c$ is so related to the ratchet-wheel that it passes to and pauses upon a contact arranged between the other contacts and connected to the ground, as clearly shown in Fig. 7, at the end of each swing of the vibrator, thus giving the line full opportunity to discharge. With one hundred and twelve contacts, all told, in the table, as shown in Fig. 1, this arrangement would give a discharge-contact after each seventh contact; and it is thought unnecessary in Fig. 7 to show the entire table, the number of contacts shown being amply sufficient to illustrate this feature.

I have described the apparatus as embodied in what I deem to be a practical and efficient form, though I do not confine myself to the specific details of construction and arrangement.

I claim as my invention—

1. The combination, substantially as set forth, of the resilient or spring-controlled vibrator, the motor-magnets arranged opposite the end of the vibrator and out of the path of vibration, and supplementary correcting-magnets.

2. The combination of the table of contacts, the rotating circuit-completer, the detent-arm, the correcting-magnets, and their circuit or circuits, which are completed when the rotating arm makes contact with the detent-arm, substantially as set forth.

3. The combination of a circular table of contacts, a trailing finger traversing said table, a vibrating bar or reed which drives said trailing finger, and contacts connected with the ground and placed between the other contacts in the circular series of contacts on the table, the parts being arranged substantially as described, whereby the trailing finger comes in contact with one of the ground-connected contacts at the ends of the swings of the vibrator.

4. The combination, substantially as set forth, of the vibrator, the vibrator-magnets, the commutator or switch devices and brushes, the motor-magnets. the correcting magnets, circuit-completing devices carried or actuated by the vibrator, which close the circuit alternately, first through one correcting-magnet and then through the other, the rotating arm, and the detent arm or contact.

5. The combination of the vibrator, the pivoted lever L', the pawls carried thereby, the ratchet-wheel, and mechanism interposed between the vibrator and the lever L' for actuating said lever.

6. The combination, substantially as set forth, of the vibrator, the actuated rocking lever L', the pawls carried thereby, the ratchet-wheel, and the trip or stop pins which trip the pawls and insure their regular action on the ratchet-wheel independently of the extent of vibration of the vibrator.

7. The combination, substantially as set forth, of the vibrator, the rocking lever, the ratchet-wheel, the pawls carried by said lever and arranged to act tangentially on the ratchet-wheel, and trip devices which throw the pawls out of engagement with the ratchet-teeth upon a determined extent of motion of said lever, irrespective of the continued or prolonged movement of the vibrator.

8. The combination of the bed-plate, the upright, the vertical vibrator rigidly fixed at its upper end, the motor-magnets seated in a depression in the bed-plate, the correcting-magnets mounted upon the face of the bed-plate, a frame, I, the table of contacts, correcting-magnet and detent carried thereby, the shaft $b$, and mechanism for actuating said shaft to rotate the trailing arm over the table of contacts and actuate the commutator devices.

9. The combination of the synchronously-actuated mechanism, a vibrator for imparting motion to said mechanism, a pivoted lever with which the vibrator is interlocked or connected, an armature on the outer end of said pivoted lever, and the vibrator-magnets.

10. The combination of the bed-plate, the upright, the horizontally-projecting frame secured on the upright, which carries the synchronously-rotating devices, and the apparatus for actuating said devices, carried by the upright and bed-plate.

11. The combination of the table of contacts, the rotating arm formed with beveled ends, as shown, and the detent or circuit-completer formed with correspondingly-beveled ends.

12. The combination of the vibrator, the armature arranged upon its end at right angles to its longitudinal axis, side armatures arranged, one upon each side, parallel with the vibrator, the motor-magnets arranged opposite the end of the vibrator, and the correcting-magnets arranged at the sides.

In testimony whereof I have hereunto subscribed my name.

ALBERT L. PARCELLE.

Witnesses:
W. Z. BROWN,
W. H. LONGSDORF.